July 1, 1947.   T. O. SUMMERS, JR   2,423,270
GYROSCOPIC CONTROL APPARATUS
Filed March 31, 1943   6 Sheets-Sheet 5

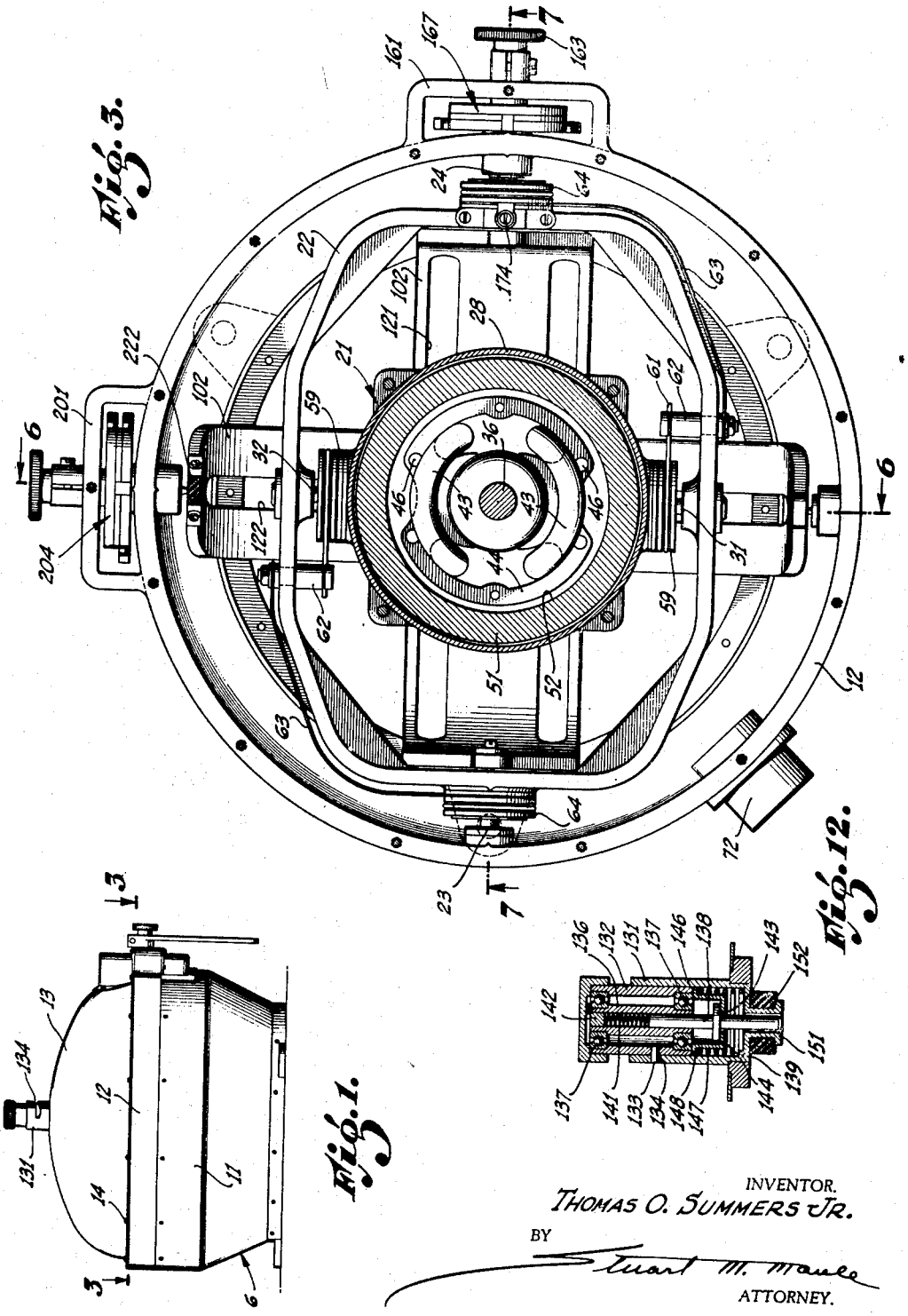

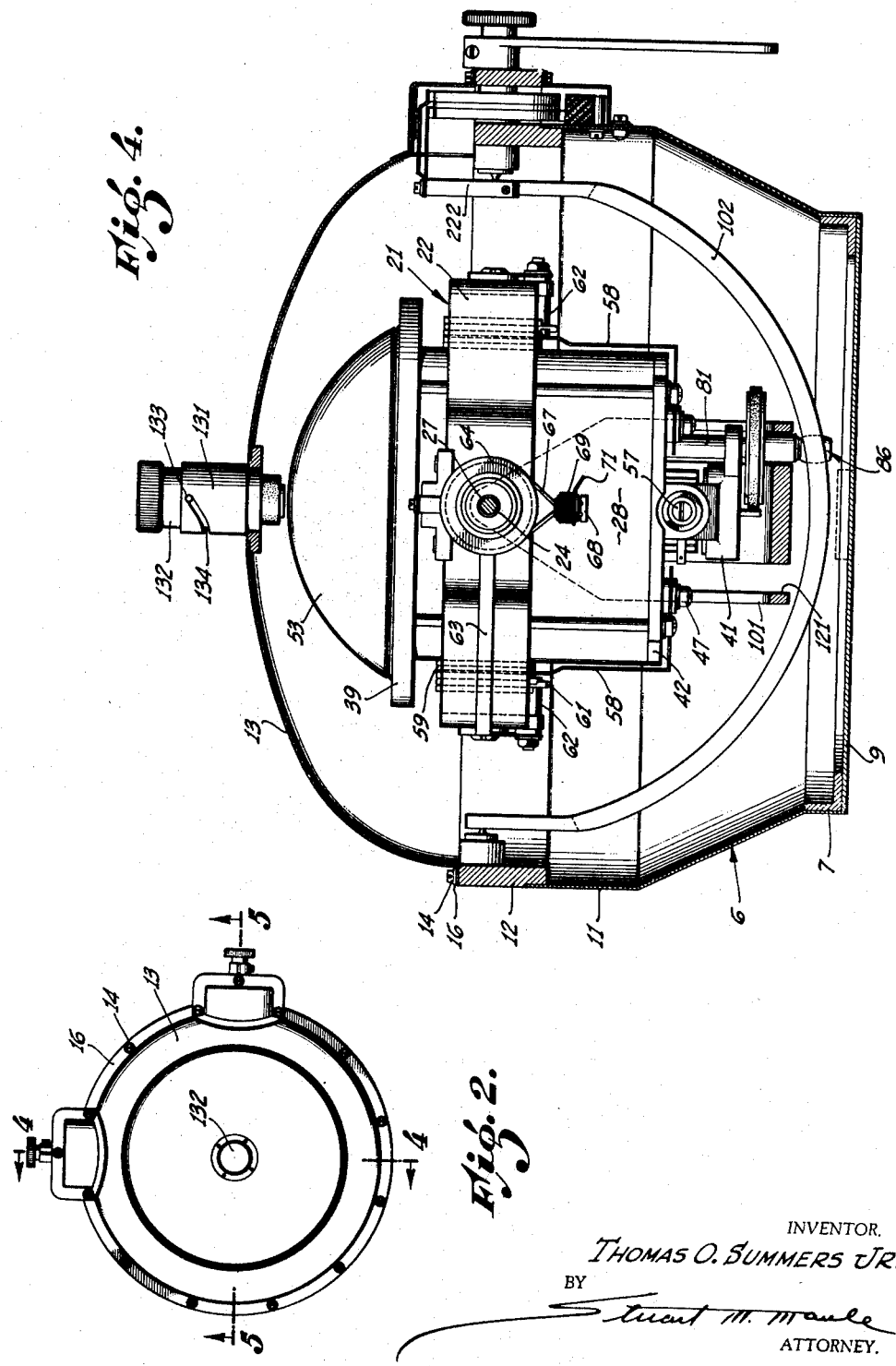

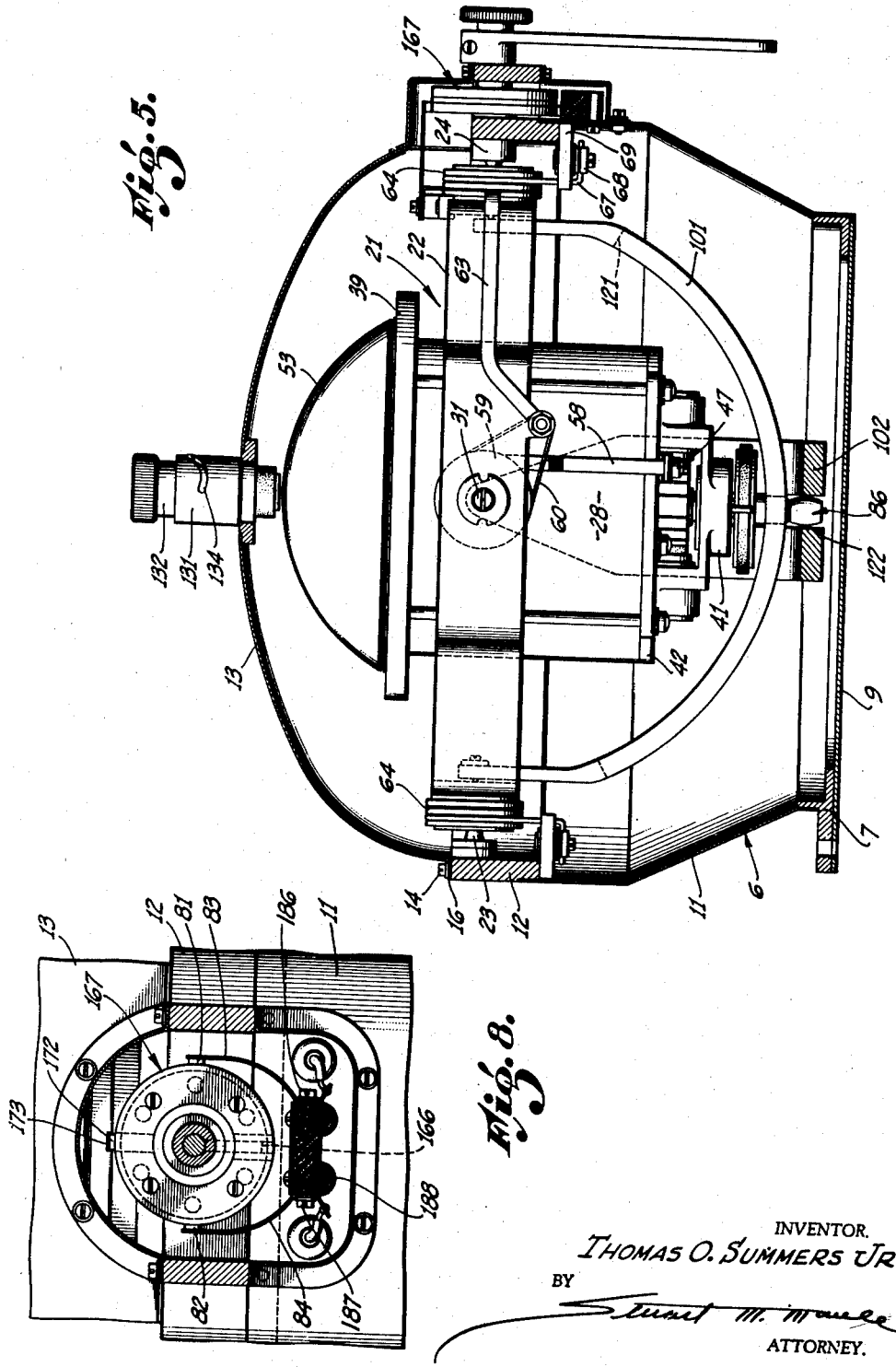

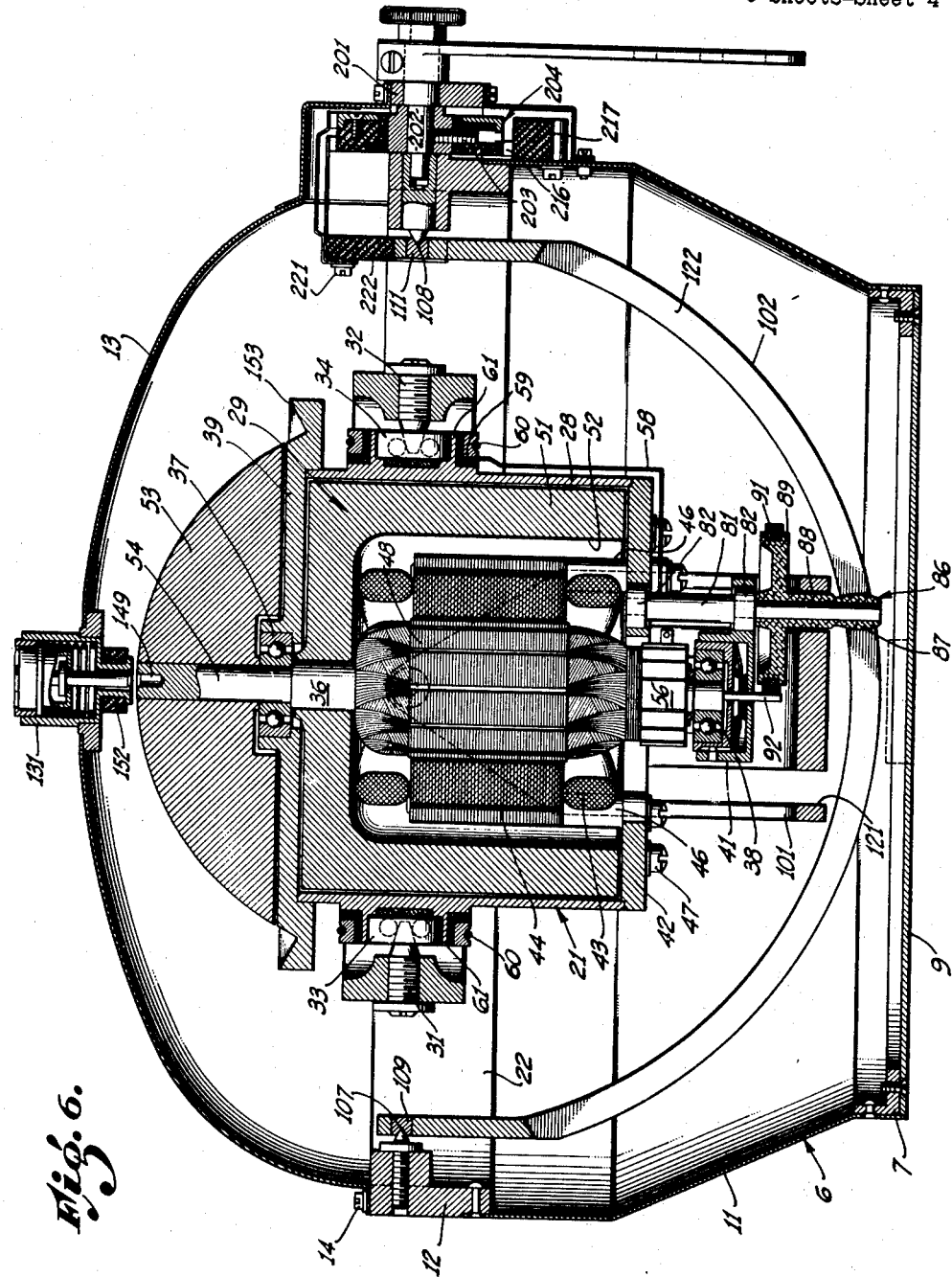

INVENTOR.
THOMAS O. SUMMERS JR.
BY
ATTORNEY.

July 1, 1947. T. O. SUMMERS, JR 2,423,270
GYROSCOPIC CONTROL APPARATUS
Filed March 31, 1943 6 Sheets-Sheet 6

INVENTOR.
THOMAS O. SUMMERS JR.
BY
ATTORNEY.

Patented July 1, 1947

2,423,270

UNITED STATES PATENT OFFICE 2,423,270

GYROSCOPIC CONTROL APPARATUS

Thomas O. Summers, Jr., Los Angeles, Calif.

Application March 31, 1943, Serial No. 481,198

22 Claims. (Cl. 74—5)

This invention relates to a gyro vertical and especially to a gyro vertical that erects itself by friction.

An object of my present invention is to provide a friction-erected gyro vertical which includes a highly efficient erecting mechanism, i. e., an erecting mechanism for retaining the gyroscope substantially in pre-selected attitude and which also is so designed that the capability of the device to erect itself is retained, when the gyroscope ceases to operate, a degree at least sufficient to prevent the idle gyroscope from falling more than a relatively small distance away from its proper operating position. Hence, assurance is provided that when operation of the gyro is resumed, the erecting mechanism is enabled to return the gyroscope to its proper operating position within a satisfactorily short period of time. The gyro vertical of the present invention therefore represents an improvement over that forming the subject matter of my copending application Serial Number 462,943, filed October 22, 1942, wherein the erecting mechanism, acting under the influence of gravity alone, is apt to develop the tendency to press the idle gyroscope away from its operating position.

A more detailed object in this connection is to accomplish this dual function by the simple and relatively inexpensive expedient of rearranging the parts and so inter-associating them that both functions are performed efficiently and accurately by a single erecting mechanism, and hence without the necessity of increasing the number or complexity of the instrument's constituent parts.

Another object of the present invention in the attainment of which the present invention represents a further improvement over the device forming the subject of my said co-pending application is to provide a gyro vertical wherein the balancing or erecting torque remains at substantially constant value regardless of whether the craft carrying the instrument is motionless, traveling at constant velocity, or experiencing acceleration.

A more detailed object in this connection is the provision of a gyroscope erecting, or balancing, mechanism wherein the erecting torque is derived through the expedient of a stator adapted, when the gyro moves away from its operating position, to move into frictional engagement with a rotor which is carried by the gyro's casing and which is rotated at constant speed so that the resultant friction between the stator and the rotor develops a force imposed upon the gyro casing in that direction which results in precessing the gyro back toward its operating position, and wherein the mechanism for driving the rotor of the erecting device includes a friction drive which will slip when a stress in excess of a predetermined maximum is imposed thereupon, thereby placing a limit on the maximum erecting torque which the erecting mechanism is capable of exerting.

A further object of the present invention is the provision of a gyro erecting device which includes means for exerting an erecting torque on the gyro and pivotally mounted pendulous means for receiving the reaction of the erecting torque and transmitting the force of reaction directly to the housing of the instrument so as to provide a satisfactorily stable base against which the erecting torque can operate.

A more detailed object in this connection is so to arrange the pendulous reaction-receiving means that the force of reaction is transmitted to the housing through their pivotal mounting, thereby avoiding the necessity of providing additional means for stabilizing the pendulous torque-receiving means.

Whereas the gyro vertical construction of the present invention is useful in several different types of instruments such as bomb sights, horizon indicators and fire control apparatus, it is a further object of the present invention to adapt the present gyro vertical for use as the control element of an automatic pilot for an aircraft by providing an improved and highly efficient control pick off mechanism capable of exercising control over the mechanisms, the operation of which is necessary for the maintenance of the airplane in the proper attitude.

A further object in this connection is to provide a control pick off mechanism as described which is capable of exercising its control over the mechanisms regulated thereby without, however, offering more than an absolute minimum of impedance to the freedom of relative movement between the gyro vertical and its casing.

The invention possesses other objects and features of advantage, some of which, with the foregoing, will be set forth in the following description of the preferred form of my invention illustrated in the drawings accompanying and forming part of the specification. It is to be understood, however, that I do not limit myself to the showing made by the said drawings and description as I may adopt variations of the preferred form within the scope of my invention, as set forth in the claims.

Referring to the drawings:

Figure 1 is a view in side elevation of a gyro vertical embodying the principles of the present invention and adapted for use as the control element of an automatic pilot.

Figure 2 is a top plan view of the instrument illustrated in Figure 1.

Figure 3 is an enlarged view in horizontal section taken upon the line 3—3 of Figure 1 with the direction of view as indicated.

Figure 4 is a view taken in transverse, vertical medial section through the housing of the instrument on the line 4—4 of Figure 2 with the direction of view as indicated, and showing the internal mechanism in end elevation.

Figure 5 is a view similar to Figure 4, taken longitudinally on a vertical, medial plane through the housing of the instrument as indicated by the line 5—5 of Figure 2 with the direction of view as indicated, and showing the internal mechanism in side elevation.

Figure 6 is a more highly enlarged sectional view taken transversely through the entire instrument upon the line 6—6 of Figure 3 with the direction of view as indicated. A portion of the figure is broken away to reduce its size.

Figure 8 is a detail view in transverse, vertical section taken on the line 8—8 of Figure 7 with the direction of view as indicated to show the improved pick off mechanism in end elevation.

Figure 12 is a detail view in vertical, medial section of the mechanism for caging the instrument.

Figure 7:
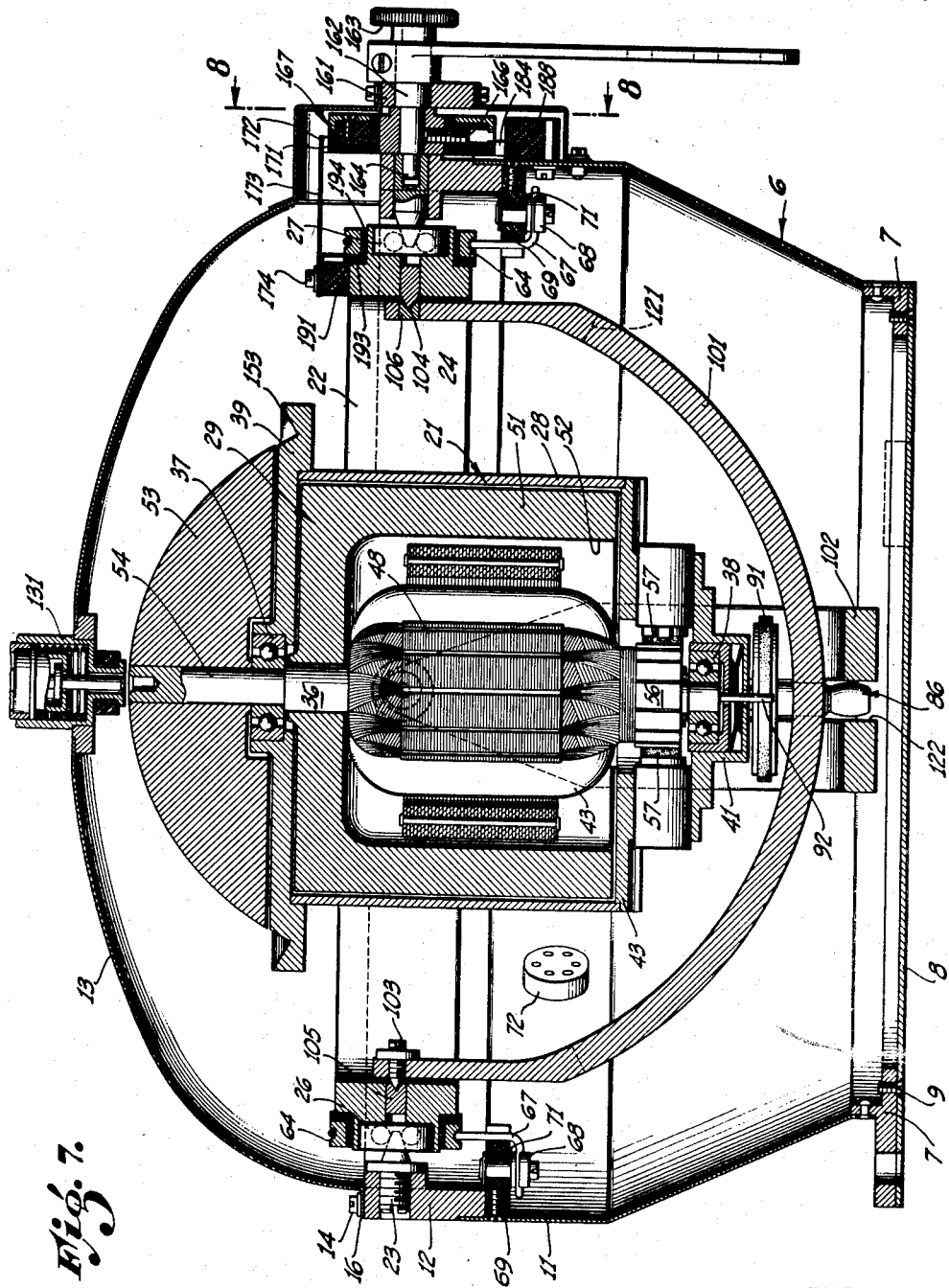
Figure 7 is a view similar to Figure 6 taken longitudinally through the entire instrument, the plane of section being indicated by line 7—7 of Figure 3 with the direction of view as indicated. A portion of the figure is broken away to reduce its size.

In terms of broad inclusion the present invention contemplates the provision of a gyro vertical wherein the erecting mechanism derives the energy necessary for the erecting torque from friction instead of from the reactive forces of air jets, thereby particularly adapting the erecting mechanism for use in connection with electrically driven gyroscopes, the erecting mechanism being characterized by its capability of substantially preserving the position of the gyroscope when idle at or so near the attitude which it occupies when operating, that when the gyroscope again is placed in operation a minimum of time will be required to bring the gyroscope with ample accuracy into its proper operating position. The erecting mechanism also is so constructed that a limit is placed on the maximum value of the erecting torque which can be exerted thereby so as to place a practical limit upon the acceleration error to which the instrument is subject. Another of the improved features of the instrument of the present invention is that that portion of the erecting mechanism which receives the force of reaction from the erecting torque transmits the reactive force directly to the housing of the instrument without effect upon the position of the element which thus receives and transmits it, the importance of this detail lying in the fact the element is pendulous so as to permit its operation by the force of gravity to preserve the proper attitude of the gyroscope. By associating an improved and simplified pick off mechanism, the details of which also form a portion of the present invention, with the gyro vertical I have adapted the instrument for use as the control unit of an automatic pilot for aircraft.

That embodiment of my present invention which has been illustrated comprises a housing 6 which, in order to minimize its weight and yet afford ample strength and rigidity, is of substantially frusto-conical form. It has an annular reinforcing base 7 to which the bottom 9 is preferably movably secured as by a plurality of screws, and an upwardly extending cylindrical flange 11 strengthened by a reinforcing annulus 12 at its upper edge. A substantially dome shaped top 13 is removably secured to the upper edge of the annulus 12 as by a plurality of screws 14 extending through a peripheral flange 16 and threaded into the upper edge of the annulus 12.

The gyro vertical, which is indicated in its entirety at 21, is supported within the housing 6 by means of a gimbal ring 22 mounted for freedom of oscillation about a longitudinal axis through the expedient of axially aligned pivot pins 23 and 24 carried by the annulus 12 of the housing and engaging anti-friction bearings 26 and 27, respectively, carried by the gimbal ring 22. The casing 28 for the rotor 29 of the gyro is mounted for freedom of oscillation within the gimbal ring 22 and about an axis perpendicular to that of the pins 31 and 32 carried by the gimbal ring 22 and engaging suitable anti-friction bearings 33 and 34, respectively, carried by the rotor-bearing casing 28. It is apparent, therefore, that the rotor-bearing casing 28 is supported for freedom of oscillation about mutually perpendicular axes, the minor gimbal axis being permanently horizontal and the major gimbal axis being normally horizontal.

The shaft 36 of the gyro's rotor 29 is normally disposed vertically and is carried by a pair of axially aligned bearings 37 and 38, the bearing 37 being mounted upon the top 39 of the rotor-bearing casing 28 and the bearing 38 being mounted upon a bracket 41 extending downwards from the bottom 42 of the rotor-bearing casing 28. The rotor 28 is spun at suitable speed by an electric motor which is contained within and forms a portion of the gyroscope. The stator windings 43 are carried by field coil laminations 44 mounted upon studs 46 which extend upwards from the bottom 42 of the casing 28 and are secured thereto as by fastening screws 47. The rotor 48 comprises windings mounted upon the shaft 36 and dimensioned to rotate within the field coils 43 and laminations 44.

Also included as a portion of the rotor is a relatively large and heavy fly wheel 51. For the purpose of designing the fly wheel 51 with the maximum radius of gyration it is dimensioned substantially to fill the interior of the rotor bearing casing 28 and is provided with a central recess 52 for the accommodation of the stator windings 43 and laminations 44 and rotor 48 of the gyro motor.

Also carried by the shaft 36 is a relatively heavy body 53 which is dome shaped, since it has a spherical upper surface, the function of which will be explained hereinbelow. The body 53 is disposed exteriorly of the rotor-bearing casing 28 and is rigidly mounted upon an extension 54 of the upper end of the motor shaft 36. Accordingly, the mass of this body 53 actually constitutes a portion of the rotating mass of the gyroscope and adds materially to its gyroscopic effect.

Energizing current is conducted to the commutator 56 of the motor by means of preferably conventional brushes 57 disposed upon opposite sides thereof. Current is conducted to each of these brushes 57 by means of a strip 58 of electrically conductive material which is electrically connected to a collector ring 59 rigid with the proximal trunnion 61 of the rotor bearing casing 28 and disposed co-axially with respect to the associated anti-friction bearing 34 and pin 32. Each of these collector rings 59 has a groove in its outer annular face for the slidable reception of a flexible cable 60 of electrically conductive material. The ends of each of these loops of conductor cable are secured to a binding post 62 rigid with the gimbal ring 22 at one side of the associated minor gimbal bearing; and from each of the binding posts 62 another strip 63 of electrically conductive material leads to a collector ring 64 rigid with the gimbal ring 22 and encircling the associated major gimbal bearing 27. In a similar manner, each of these collector rings 64 is provided with a peripheral groove for the slidable reception of a flexible cable 67 of electrically conductive material, the ends of which are secured to a binding post 68 carried by a block 69 of dielectric material mounted rigidly upon the inner surface of the housing 6. Each of the binding posts 68 is electrically connected as by a conductor 71 with a connector plug 72 mounted upon the housing 6 in such position that it is easily accessible from the exterior thereof.

Means are provided for erecting the gyroscope, i. e., for causing it automatically to maintain a predetermined attitude, preferably with the axis of spin of the rotor 48 vertical. Being electrically driven there is no flow of air associated with the instrument suitable to permit the erection of the device to be operated by the reactive forces of air jets. Instead, the erecting mechanism depends for its operation on forces derived from a frictional drag, the instrument being so designed that it includes cooperatively associated rotor and stator elements carried respectively by the gyroscope and the housing 6 and adapted to be brought into frictional engagement with each other whenever the gyro wanders from its normal position. The side thrust developed from the frictional inter-engagement between the rotor and stator applies a torque to the freely suspended gyroscope in such a manner and in such a direction that it acts as an erecting torque, causing the gyroscope immediately to precess itself back to its normal position in accordance with the well known principles of gyroscopic action.

The rotor element 81 of the erecting mechanism conveniently takes the form of a rotatable member extending vertically downwards from the bottom 42 of the rotor bearing casing 28. The element 81 is journaled for free rotation by means of axially aligned anti-friction bearings 82 mounted respectively in the bottom 42 of the rotor bearing casing 28 and in the bracket 41. Affixed to the lower end of element 81 and constituting an extension thereof is a head 86 preferably composed of suitable material having a relatively high resistance to wear, such as one of the well known phenolithic compounds, "Bakelite," or the like. On this head are provided a substantially spherical lower end 87, a cylindrical intermediate portion 88, and a disc 89. A friction band 91 of rubber or, preferably, a synthetic rubber such as "neoprene," is affixed to the peripheral edge of disc 89; and, in order to provide a positive drive for element 81 and its head 86 this friction band 91 is engaged by an extension 92 of the lower end of the motor shaft 36. Thus it may be seen that so long as the motor of the gyroscope is energized rotor element 81 and its head 86 will be driven positively, but at a considerably reduced speed as compared to that of the motor.

Figure 11:
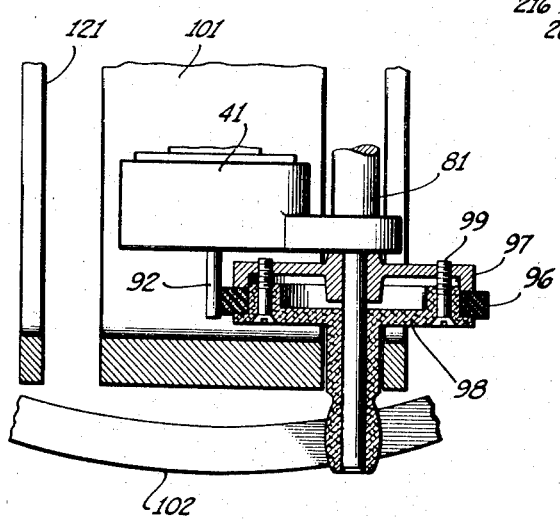
Figure 11 is a detail view in longitudinal, medial, vertical section illustrating a slightly modified form of driving mechanism for the rotor of the erecting device.

Figure 11 illustrates a slightly modified form of head for the lower end of rotor element 81. In this form the friction band 96 which is engaged by the shaft extension 92 is gripped between an upper disc 97 and a head 98 of suitable friction material, the head 98 and disc 97 being adjustably inter-connected as by a plurality of screws 99, the tightening of which results in the imposition of increased pressure upon the friction band or tire 96. Although this increased pressure is exerted axially the result thereof is to squeeze the deformable tire radially outwards and thereby increase the degree of pressure exerted by the tire against the shaft extension 92. Accurate adjustment of the mechanism to achieve the exact degree of pressure desired is thus provided for, as well as means for compensating for wear.

The stator element of the erecting mechanism takes the form of a pair of arcuate, substantially semi-circular masses 101 and 102 which respectively lie normally in planes extending longitudinally and transversely of the instrument. Both of these masses 101 and 102 are normally in stable equilibrium, being pendulously suspended independently of each other and for oscillation about longitudinal and transverse axes, respectively. Moreover, the suspension of the arcuate masses 101 and 102 is independent of the gimbal mounting for the gyroscope. Toward this end, the longitudinally extending erector mass 101 is carried by a pair of axially aligned pintle pins 103 and 104. The pin 103 is carried by the forward end of the arcuate mass 101 and its pointed end seats within a bearing 105 which is rigid with the gimbal ring 22 in axial alignment with the pin 23 and bearing 26 whereby the forward end of the gimbal 22 is supported. The pin 104 supporting the after end of the arcuate mass 101 is carried by the gimbal ring 22 in axial alignment with the pin 24 and bearing 27 which cooperate to support the after end of the gimbal 22. The pointed end of the pin 104 seats within a suitable bearing 106 carried by the after end of the arcuate mass 101. Since the pins 103 and 104 constitute the sole inter-connection between the arcuate mass 101 and the gimbal 22 and since these pins are axially aligned with the pins which support the gimbal, both the gimbal 22 and the arcuate mass 101 are suspended for free oscillation about a common axis but independently of rotary movements of each other about that axis.

The transversely extending arcuate mass 102 is supported by pintle pins 107 and 108 which are rigid with the cylindrical upper portion 12 of the housing 11. The pins 107 and 108 have their pointed ends seated in bearings 109 and 111, respectively, carried by the ends of the arcuate mass 102. The pins 107 and 108 are offset 90° from the pins 23 and 24 which support the gimbal 22 and the longitudinal arcuate mass 101 with the result that the arcuate mass 102 is normally disposed in a plane extending transversely of the instrument and perpendicular to the plane in which the other arcuate mass 101 is disposed.

It should be emphasized that the pins 107 and 108 are so arranged that the axis of the arcuate mass 102 pierces the major gimbal axis at precisely the same point as does the minor gimbal axis.

As stated, both the arcuate masses 101 and 102, or "bails," as they are commonly called, are freely pendulous and hence normally hang vertically downwards from their respective pivotal supports. However, they both lie in paths traversed by the head 86 of rotor element 81 so as to be frictionally engaged by the rotor element, whenever the gyroscope is displaced from that position wherein the axis of the motor shaft 36 is vertical. For this purpose the masses 101 and 102 are provided with longitudinally extending slots 121 and 122 respectively. The cylindrical portion 88 of head 86 is disposed within the slot 121 of the longitudinally extending bail 101, whereas the spherical end 87 of the head is seated within the slot 122 of the transversely extending bail 102. It is evident therefore, that each of the stator elements 101, 102 is connected to the gyro to partake of movement thereof about one of its gimbal axes but to remain stationary when the gyro rotates about the other of its gimbal axes.

The parts are so proportioned that each slot is slightly wider than that portion 86, 87 of rotor element 81 which is engaged therein, the purpose being to prevent the development of friction between the rotor element and either of the bails so long as the gyroscope is disposed substantially vertical. However, immediately any displacement of the gyro from its vertical position develops, the rotor element will move into engagement with one or both of the bails, depending upon the direction of such displacement. This will result in the development of friction between the rotor element and that bail or those bails, as the case might be. Since the rotor portion of the frictional erecting mechanism, is carried by the gyroscope, the frictional force thus developed will develop a reactive force exerted against the gyroscope. The direction of this force will be tangential with respect to rotor element 81 and therefore perpendicular to the direction in which the element moved during the displacement of the gyroscope which preceded the engagement. Consequently, by assuring that the rotation of element 81 is in the proper direction, this force exerted against the gyro can be utilized to function as an erecting torque to cause the gyro to precess itself back again to its proper operating position. This is one of the reasons that, instead of having an extension of the shaft 36, itself, engage the stators, the described mechanism is employed, wherein rotor element 81 is rotated in the opposite direction from that in which the shaft 36 turns. As the result of this arrangement, if the motor of the gyro rotates in a clockwise direction as viewed upon Figure 3, rotor element 81 will be rotated in a counter-clockwise direction. Then, as the gyro becomes displaced from the vertical, say, for example, in a clockwise direction as viewed in Figure 6, i. e., about the major gimbal axis, rotor element 81 will move to the left as viewed in that figure, and its leading side, i. e., the side of the element which is toward the left of Figure 6, will come into engagement with the bail 101. Owing to the fact that element 81 is rotating in a counter-clockwise direction as viewed from the top, that side of the element which engages the stator mass 101 will be moving toward the observer (Fig. 6) with the result that a thrust will be exerted against the gyroscope away from the observer, i. e., tending to make the gyroscope rotate about the minor gimbal axis, and clockwise as viewed in Figure 7. Actually only an exceedingly small amount of motion will occur in this direction, but it will, in accordance with the well known principles of gyroscopic action, cause the gyro to precess itself about the major gimbal axis, and back to the vertical, thus correcting the precedent displacement of the gyroscope.

In this description of the displacement of the gyroscope and the precession thereof back to the vertical, it has been assumed that the displacement occurred accurately about the major gimbal axis and that no displacement occurred about the minor gimbal axis. Consequently no engagement between the rotor element and the transversely extending bail 102 occurred since the spherical end 87 of head 86 would, under those circumstances, merely move along the slot 122 without coming into engagement with either side thereof. However, when displacement of the gyro about the minor gimbal axis occurs, element 81 will move freely within the slot 121 of the longitudinally extending bail 101 without making any engagement with this longitudinal bail, but the spherical end 87 will engage the transverse bail 102, setting up a tangential frictional force, as in the previously described action, and developing a resultant force which reacts against the gyro as an erecting torque about the major gimbal axis, causing the gyro to immediately erect itself back about the minor gimbal axis to its proper operating position. It will be understood that if, as almost always proves to be the case, the displacement of the gyro is anywhere in between these two described directions of movement, both bails will be engaged simultaneously, setting up a tangential frictional force with each. Each of these frictional forces will develop a reactive force and since these two forces of reaction are perpendicular to each other they will resolve themselves into a resultant force, the direction of which is perpendicular to the precedent displacement and will cause the gyro to immediately precess itself back to its proper operating position.

As is well known, the exertion of a torque upon a gyroscope about a given axis causes the gyroscope to precess itself about an axis perpendicular to that about which the erecting torque occurred. It is for this reason that the instrument of the present invention is designed to develop a frictional force between the contacting rotor and stator elements, which is exerted tangentially with respect to the rotor element at the point of contact and, being tangential, is directed perpendicularly with respect to the direction in which the movement of the rotor element occurred. Consequently, the force of reaction from the frictional engagement, which reactive force is exerted against the gyroscope and therefore operates as an erecting torque, is perpendicular to the precedent displacement. It is apparent, however, that in order to produce this frictional force it is necessary for the stator, or bail, to press against the rotor element, and the direction of such pressure will coincide with the direction of precedent displacement. Consequently it is desirable to provide means for neutralizing the force exerted by the bail or bails, as the case might be, which otherwise would make itself manifest as an acceleration torque operating about the same axis as that about which the precedent displacement has occurred. It is with this object in view that the body 53 is carried by the gyroscope on the opposite end thereof from that with which the rotor element 81 is associated. The parts are so proportioned and arranged that the product of mass of the body 53 multiplied by the distance of its center of gravity from the common point at which all of the gimbal and bail axes intersect, is equal to the product of mass of each of the bails 101 and 102 multiplied by the distance of their respective centers of gravity from the aforesaid common point of intersection. Substantially this same relationship exists in respect of the device forming the subject matter of my said copending application, wherein, however, the respective positions of the counter balance and bails are reversed, i. e., the erecting bails are associated with the upper end of the gyroscope and the counter-balancing body is associated with the lower end of the gyroscope.

The trouble with this arrangement is that except for the caging mechanism the gyro would flop over whenever it was shut off. This phenomenon is sometimes difficult to understand inasmuch as each bail, though individually unstable, nevertheless is counter-balanced by the pendulous gyro rotor structure. A condition of neutral equilibrium exists, however, only when the gyro is in its normal position. For example, let us assume that the gyro is idle and its instantaneous position is such that it has moved from its normal position about its lateral axis only. Under these circumstances the gyro would, of course, maintain its neutral equilibrium about its lateral axis. However, it would now be in a position of unstable equilibrium about its longitudinal axis, because the longitudinal bail has not moved, and its effectiveness to upset the gyro has not lessened. On the other hand the center of gravity of the pendulous gyro rotor structure is now closer to its longitudinal axis and hence exerts less stability about this axis. Accordingly the gyro will topple over about its longitudinal axis. By reversing the positions of these parts in accordance with the present invention, I have provided a gyro vertical which possesses numerous advantages and refinements as compared with that of my said copending application. For example, when the gyroscope of the present device is idle there is never any tendency for the erecting bails to press the gyroscope away from that position thereof wherein the axis of spin of the rotor is vertical. On the contrary, under substantially all circumstances, the effect of the erecting bails 101, 102, even when the gyroscope is idle, is to retain the gyroscope with its axis of spin in the vertical, or, in the event the gyro has become displaced from its vertical position, to urge the gyroscope back towards its position of verticality. This is explained by the fact that whenever the gyroscope becomes displaced from its vertical position, the center of gravity of the counter-balancing body 53 moves downwards, i. e., toward the horizontal plane of the axis about which displacement of the gyro has occurred. If the gyro were to turn through 90° the center of gravity of the body 53 would actually arrive in that plane. If, in so turning, the rotation is accurately about only one of the gimbal axes and, therefore, in a direction perpendicular to the other gimbal axes, then, during such movement, the erecting bail, the pivotal axis of which coincides with the gyro's rotation, will turn to exactly the same extent as does the gyro, thus maintaining the state of neutral equilibrium of the gyro and that same bail. With respect to the other bail, however, the state of neutral equilibrium no longer prevails, and one of stable equilibrium develops, for the reason that as the gyro approaches 90° of displacement from the vertical, the center of gravity of the body 53 approaches the axis about which it would have to turn if any displacement of the said other bail should occur, with corresponding reduction in the torque which the body 53 is capable of exercising upon the gyro to cause it to turn in that direction wherein its rotation would be accompanied by displacement of said other bail.

Consider, for example, that the displacement of the gyro occurs accurately about the major gimbal axis. During such movement of the gyro, the rotor element 81 moves longitudinally of the slot 122 in the transverse bail 102 without effecting any movement whatsoever of the bail 102 about the axis of its supporting pins 107, 108. Consequently, the torque which this undisturbed erecting bail 102 is capable of exerting against the gyro remains constant while the torque exerted upon the gyro by the counter-balancing body 53 about the axis of the bail 102 has been materially reduced as the result of the lowering of its center of gravity to a position closer to the axis of the pins 107, 108. In the same manner, when displacement of the idle gyro about the minor gimbal axis occurs, the rotor element pin 81 moves along the slot 121 of the longitudinally extending erector bail without effecting any movement thereof so that again in this instance the torque of the longitudinally extending bail 101 upon the gyroscope is unaffected while the torque exerted upon the gyro by the counter-balancing body 53 is reduced.

It should be borne in mind, however, that movement of the gyroscope accurately about either of the gimbal axes represents the most unfavorable situation which possibly could arise and furthermore one which probably never would arise. Actually any displacement of the idle gyroscope from position of verticality would, almost without exception, occur in a direction somewhere in between the two described movements, so that both bails 101, 102 would be moved to some extent. However, each of these bails will under these circumstances be moved through a distance less than that which it would experience were the movement of the rotor element 81 accurately perpendicular to the plane of that bail with the result that its center of gravity will be moved upwards through a distance less than that through which the center of gravity of the counter-balancing body 53 moves downwards. Therefore the reduction in the effectiveness of each bail in urging the idle gyro to its vertical position is reduced at a lesser rate than is the effectiveness of the counter-balancing body 53 in urging the idle gyro to move away from vertical position. For this reason, the instant any deviation of the idle gyro from its vertical position occurs, it will change from a condition of neutral equilibrium to one of stable equilibrium wherein the effect of the bails 101, 102 will be that of urging the gyro back toward its vertical position. Consequently even though the gyro may remain idle for prolonged periods, assurance is provided that when it again is placed in operation it will either be in its desired vertical position or will be so closely adjacent thereto that a minimum of time will be required for the gyro to erect itself back to its operating position.

A further advantage is taken of the fact that the body 53 is at the extreme upper portion of the gyroscope and that it rotates when the gyroscope is in operation. The upper surface of the body 53 has the configuration of a spherical zone with one base. Mounted above the dome-shaped body 53, and preferably in axial alignment with the rotor of the gyroscope when the latter is in its normal position, is a cylindrical housing 131 having a plunger 132 reciprocably mounted in and extending upwards from its upper end. A laterally extending pin 133 is seated within an inclined slot 134 in the housing 131 so that by rotating the plunger 132, the plunger 132 is moved axially within the housing 131. A sleeve 136 is journaled within the plunger 132 as by antifriction bearings 137; and a pin 138, the upper end of which is reciprocable within the bore of the sleeve 136, extends downwards from the sleeve and through the bottom 139 of the cylindrical housing 131 to a position closely adjacent to the upper surface of the body 53. A spring 141 under compression between the upper end of the pin 138 and a block 142 in the upper end of the bore of the sleeve 136, continually urges the pin 138 downwards but preferably with a relatively light force. Downward motion of the pin 138 is limited by a flange 143 thereon in cooperative association with an inwardly extending flange 144 on the lower end of a reciprocable cage 146 in the lower end of the cylindrical housing 131. Another spring 147 which is materially stronger than the spring 141 and which is under compression between the bottom 139 of the housing 131 and an outwardly extending flange 148 on the top of the cage 146, continually urges the cage 146 upwards to that position in which the extreme lower end of the pin 138 is elevated slightly above the surface of the dome-shaped body 53. By turning the plunger 132 in that direction which seats the pin 133 in the lower end of its slot 134, the cage 146 is forced downwards against the action of the spring 147 and so lowering its stop flange 144 that the spring 141 is permitted to press the pin 138 downwards. If the gyroscope is in its normal position a socket 149 in the outer surface of the body 53 and arranged axially thereof will then be in registry with the pin 138, permitting the lower end of the pin to enter the socket 149 and lock the gyroscope to the housing 11, i. e., to "cage" the instrument. However, in the event that the gyroscope is displaced from its normal position, with the socket 149 out of axial alignment with the pin 138, the pin will engage the outer spherical surface of the body 53. Accordingly, the pin 138 will exert a frictional drag upon the rotor of the gyroscope (it being assumed, of course, that the gyroscope is in operation) and the reactive force of the drag will exert an erecting torque on the gyro, causing the gyro to precess itself back to normal position within its housing 6, and bringing the socket 149 into alignment with the pin 138 whereupon the pin will enter the socket 149 and thereby cage the instrument. When it is desired to uncage the instrument it is necessary only to rotate the plunger 132 in the opposite direction, thus sliding the pin 133 to the upper end of its slot 134 and thereby elevating the plunger 132 and permitting the spring 144 to raise the cage 146, the lower flange 144 of which is thus caused to retract the pin 138 from the socket 149.

An axial extension 151 on the bottom 139 of the housing 131 is provided with a resilient cushion 152; and a flange 153 which is formed as a peripheral extension of the top 34 of the rotor bearing casing 28 is adapted to engage the cushion 152 whenever the gyroscope turns about either of its gimbal axes through the maximum desired extent of such movement. Hence the flange 153 and the cushioned stop 151, 152 cooperate to define a bumper which serves to limit the extent of movement of the gyroscope about both of its gimbal axes.

Figure 9:
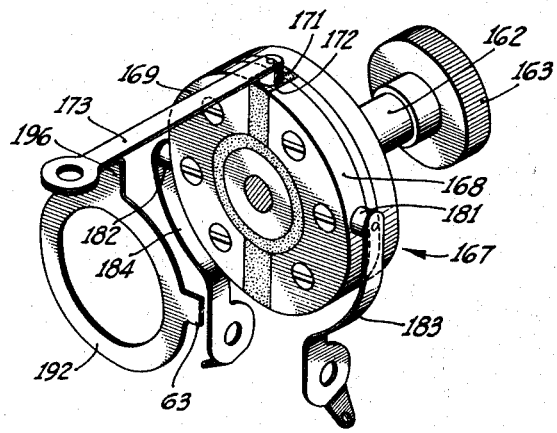
Figure 9 is a still more highly enlarged view in perspective showing the pick off mechanism associated with the major gimbal axis.

Whereas the gyro vertical hereinabove described is capable of universal application, i. e., is adaptable for use in connection with numerous types of navigation instruments, it has been illustrated herein as the control unit of an automatic pilot. Toward this end, the gyro vertical of the present invention has been provided with a "control pick off" mechanism, the function of which is to operate control devices (not shown) for the operation of controlling airfoils of the plane immediately upon development of any relative motion between the gyro vertical and the housing 11. It should be borne in mind that the housing 11 is mounted directly upon some fixed portion of the airplane and consequently partakes of all movements of the airplane both about the longitudinal and the transverse axes, while the gyro vertical within the housing 11 remains fixed with respect to both of these axes. Means are provided for effecting control in response to relative movement of the housing 11 and gyro vertical about either of the gimbal axes. Figure 7 illustrates the "pick off" mechanism whereby motion is imparted to control mechanism coincidentally with relative motion between the housing 11 and the gyro vertical about the longitudinal, or major gimbal axis. Mounted rigidly upon the cylindrical top flange 12 of the housing 11 is an outwardly extending bracket 161. A shaft 162 having, preferably, a knurled head 163 on its outer end, is mounted for rotary movement in the bracket 161 and the cylindrical flange 12 so that its inner end 164 is seated within a complementary socket in the outer end of the pin 24 upon which the gimbal ring 22 is mounted. Accordingly, the shaft 162 is coaxially aligned with the gimbal ring 22. Affixed to the shaft 162 as by a set screw 166 is a distributor ring 167 composed of suitable dielectric material and having mounted upon its outer periphery two spaced strips 168, 169 of conductive material (see Figure 9) the outer edges of which conform to the configuration of the distributor ring 167. The proximal ends of the strips 168, 169 are spaced by a portion 171 of the dielectric material extending upwards between the strips 168, 169 so that its outer surface constitutes a smooth continuation of the outer surfaces of the conductor strips. The portion 171 of dielectric material is slightly wider than a contact element 172. This contact 172 frictionally engages the distributor ring 167, and is carried upon the outer end of a resilient contact arm 173 which is affixed as by a mounting screw 174 upon the gimbal ring 122 with the result that the arm 173 and the contact 172 partake of movement of the gyroscope about the longitudinal or major gimbal axis, or, speaking more accurately, the contact 172 is stabilized while the distributor ring 167 rotates with the housing 11 about the major gimbal axis. When such relative motion occurs, the distributor ring 167 will turn under the contact 172, bringing either one or the other of the conductor strips 168, 169 into electrical engagement with the contact 172, depending upon the direction of such relative movement, and thereby completing an electric circuit for the operation of a suitable airfoil-controlling mechanism, it being understood that electrical contacts 181 and 182, carried by resilient arms 183, 184, respectively, and pressed thereby against the conductor strips 168 and 169, respectively, are mounted as by screws 186 and 187, respectively (see Figure 8), upon a block of insulation material 188 rigid with the housing 11. The contact carrying arm 173 is electrically insulated from the gimbal ring 122 as by a block 191 of dielectric material. Means are provided for energizing the arm 173 and its contact 172. In the case of the "pick off" device associated with the major gimbal axis, this is a relatively simple matter because of the proximity of the collector ring 64 which is included as a portion of the electrical circuit for the energization of the gyro motor. A ring 192 of electrically conductive material is engaged between the collector ring 64 and an outwardly extending flange 193 on the sleeve 194 of insulated material upon which the collector ring 64 is mounted. An upwardly extending tongue 196 integral with the ring 192 is engaged under the contact bearing arm 173, preferably being mounted by the same screw 174.

Figure 10:
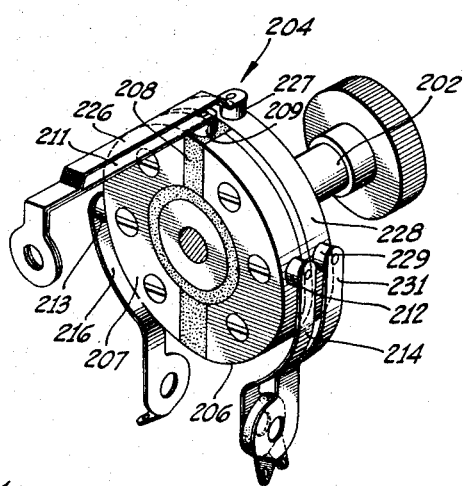
Figure 10 is a view similar to Figure 9 showing the pick off mechanism associated with the minor gimbal axis.

Figures 6 and 10 illustrate the "pick off" device associated with the minor gimbal axis. A bracket 201 extending laterally outwards from the cylindrical top flange of the housing 11 supports a shaft 202 in axial alignment with the pins 107 and 108 which support the transverse erecting bail or stator element 102. As in the case of the shaft 162, this shaft 202 is fitted to its supporting bearings with sufficient firmness to insure that the shaft 202 will partake of the movements of the housing 11 about the axis of the pins 107 and 108. Affixed to the shaft 202, as by a set screw 203, is another distributor ring 204 also provided with contact strips 206 and 207, the outer surfaces of which define the peripheral edge of the disc 204. The proximal ends of the strips 206 and 207 are spaced by a portion 208 of the insulative material of which the disc 204 is composed, this portion 208 being slightly wider than a contact element 209 which is carried by a resilient arm 211 of conductive material. As in the case of the previously described "pick off" device the contact strips 206, 207 are engaged by contacts 212 and 213, respectively, carried by resilient contact arms 214 and 216, respectively, which are mounted rigidly upon a block 217 of insulative material which is rigid with housing 11. The contact-carrying arm 211 is affixed as by a mounting screw 221 upon a block 222 of insulative material; it is rigidly secured to the transversely extending erector bail 102 with the result that the contact element 209 is stabilized by the gyroscope while the housing 11 moves, rotating the collector ring 204 under the contact element 209 and thus bringing one or the other of the conductor strips 206 or 207 into engagement with the contact element 209, depending upon the direction of such movement. In this instance energization of the contact element 209 is complicated by the fact that no source of electrical energy is immediately adjacent thereto. Instead a second contact-carrying arm 226 also is mounted by the screw 221 in electrical contact with the arm 211. This second arm 226 extends over and beyond the contact element 209 so that its contact element 227 is disposed in position to engage a ring 228 of conductive material which is carried by the disc 204 in alignment with the contact strips 206 and 207. This contact ring 228 is engaged by a contact element 229 carried by a resilient arm 231 which is mounted by the same mounting screw (not shown) as that which mounts the arm 216, these two arms being insulated from each other, however, by a washer 232 of suitable insulative material.

I claim:

1. In a gyro-vertical, a gyroscope and independently mounted erecting means therefor comprising gravity influenced means operative during operation of said gyroscope for exerting torque thereupon in a direction perpendicular to the direction of displacement of the gyroscope from pre-selected position, said erecting means also exerting a torque against said gyroscope in a direction perpendicular to the plane including the axis of displacement of the gyroscope from said predetermined position during idle periods of said gyroscope.

2. In a gyro-vertical, a gyroscope and independently mounted erecting means therefor comprising gravity influenced means operative during operation of said gyroscope for exerting torque thereupon in a direction perpendicular to the direction of displacement of the gyroscope from operating position thereof, said erecting means also exerting a torque against said gyroscope in a direction toward said operating position upon displacement of said gyroscope therefrom during idle periods of said gyroscope.

3. A gyro-vertical construction comprising a gyroscope including a rotor structure mounted for freedom of movement about a horizontal axis and erecting means therefor comprising a normally vertical rotor element revolubly mounted on said gyroscope, means for rotating said element, and a pendulous mass freely mounted for oscillation under the influence of gravity about a horizontal axis lying in the same plane as said axis of said gyroscope, said mass being disposed in the path traversed by said element when said gyroscope moves about its said axis.

4. A gyro-vertical construction comprising a gyroscope including a rotor structure mounted for freedom of movement about a horizontal axis and erecting means therefor comprising a normally vertical rotor element revolubly mounted on said gyroscope and extending downwards therefrom, means for rotating said element, and a pendulous mass freely mounted for oscillation under the influence of gravity about a horizontal axis lying in the same plane as said axis of said gyroscope, said mass being disposed in the path traversed by said element when said gyroscope moves about its said axis.

5. A gyro-vertical construction comprising a gyroscope including a rotor structure mounted for freedom of movement about a horizontal axis and erecting means therefor comprising a normally vertical rotor element revolubly mounted on said gyroscope, means for rotating said element, and a mass freely mounted for oscillation under the influence of gravity about a horizontal axis lying in the same plane as said axis of said gyroscope, said mass being disposed in the path traversed by said element when said gyroscope moves about its said axis, and said mass being in stable equilibrium when said element is vertical but being displaced from its normal position of equilibrium when said element is removed from vertical.

6. A gyro-vertical construction comprising a gyroscope including a rotor structure mounted for freedom of movement about horizontal axes perpendicular to each other and erecting means therefor comprising a normally vertical rotor element revolubly mounted on said gyroscope, means for rotating said element, and a pair of pendulous masses freely mounted for oscillation under the influence of gravity about horizontal axes, each of said axes of said masses lying in the same plane as one of said axes of said gyroscope, said masses being disposed in paths traversed by said element when said gyroscope moves about its said axes.

7. A gyro-vertical construction comprising a gyroscope including a rotor structure mounted for freedom of movement about horizontal axes perpendicular to each other and erecting means therefor comprising a normally vertical rotor element revolubly mounted on said gyroscope and extending downwards therefrom, means for rotating said element, and a pair of pendulous masses freely mounted for oscillation under the influence of gravity about horizontal axes, each of said axes of said masses lying in the same plane as one of said axes of said gyroscope, said masses being disposed in paths traversed by said element when said gyroscope moves about its said axes.

8. A gyro-vertical construction comprising a gyroscope including a rotor structure mounted for freedom of movement about a horizontal axis and erecting means therefor comprising a normally vertical rotor element revolubly mounted on said gyroscope, means for rotating said element, and a pendulous mass freely mounted for oscillation under the influence of gravity about a horizontal axis normally coinciding with said axis of said gyroscope, said mass being disposed in the path traversed by said element when said gyroscope moves about its said axis.

9. A gyro-vertical construction comprising a gyroscope including a rotor structure mounted for freedom of movement about a horizontal axis and erecting means therefor comprising a normally vertical rotor element revolubly mounted on said gyroscope and extending downwards therefrom, means for rotating said element, and a pendulous mass freely mounted for oscillation under the influence of gravity about a horizontal axis normally coinciding with said axis of said gyroscope, said mass being disposed in the path traversed by said element when said gyroscope moves about its said axis.

10. A gyro-vertical construction comprising a gyroscope including a rotor structure mounted for freedom of movement about horizontal axes perpendicular to each other and erecting means therefor comprising a normally vertical rotor element revolubly mounted on said gyroscope, means for rotating said element, and a pair of pendulous masses freely mounted for oscillation under the influence of gravity about horizontal axes, each of said axes of said masses normally coinciding with one of said axes of said gyroscope, said masses being disposed in the paths traversed by said element when said gyroscope moves about its said axes.

11. A gyro-vertical construction comprising a gyroscope including a rotor structure mounted for freedom of movement about horizontal axes perpendicular to each other and erecting means therefor comprising a normally vertical rotor element revolubly mounted on said gyroscope and extending downwards therefrom, means for rotating said element, and a pair of pendulous masses freely mounted for oscillation under the influence of gravity about horizontal axes, each of said axes of said masses normally coinciding with one of said axes of said gyroscope, said masses being disposed in paths traversed by said element when said gyroscope moves about its said axes.

12. A gyro-vertical construction comprising a gyroscope including a rotor structure mounted for freedom of movement about horizontal axes perpendicular to each other and erecting means therefor comprising a normally vertical rotor element revolubly mounted on said gyroscope, means for rotating said element, a pair of pendulous masses freely mounted for oscillation under the influence of gravity about horizontal axes, each of said axes of said masses lying in the same plane as one of said axes of said gyroscope, said masses being disposed in paths traversed by said element when said gyroscope moves about its said axes to cause said masses to exert both frictional and acceleration torques on said gyroscope, and means carried by said gyroscope on the opposite side of its said axes from said element for equilibrating said acceleration torques when gyroscope is in its normal position.

13. A gyro-vertical construction comprising a gyroscope including a rotor structure mounted for freedom of movement about horizontal axes perpendicular to each other and erecting means therefor comprising a normally vertical rotor element revolubly mounted on said gyroscope and extending downwards therefrom, means for rotating said element, a pair of pendulous masses freely mounted for oscillation under the influence of gravity about horizontal axes, each of said axes of said masses lying in the same plane as one of said axes of said gyroscope, said masses being disposed in paths traversed by said element when said gyroscope moves about its said axes to cause said masses to exert both frictional and acceleration torques on said gyroscope, and means carried by said gyroscope on the opposite side of its said axes from said element for equilibrating the acceleration torques exerted on said gyroscope by said masses when said gyroscoue is in its normal postion.

14. A gyro-vertical construction comprising a gyroscope including a rotor structure mounted for freedom of movement about horizontal axes perpendicular to each other and erecting means therefor comprising a normally vertical rotor element revolubly mounted on said gyroscope, means for rotating said element, a pair of pendulous masses freely mounted for oscillation under the influence of gravity about horizontal axes, each of said axes of said masses normally coinciding with one of said axes of said gyroscope, said masses being disposed in paths traversed by said element when said gyroscope moves about its said axes to cause said masses to exert both frictional and acceleration torques on said gyroscope, and means carried by said gyroscope on the opposite side of its said axes from said element for equilibrating the acceleration torques exerted on said gyroscope by said masses when said gyroscope is in its normal position.

15. A gyro-vertical construction comprising a gyroscope including a rotor structure mounted for freedom of movement about horizontal axes perpendicular to each other and erecting means therefor comprising a normally vertical rotor element revolubly mounted on said gyroscope and extending downwards therefrom, means for rotating said element, a pair of pendulous masses freely mounted for oscillation under the influence of gravity about horizontal axes, each of said axes of said masses normally coinciding with one of said axes of said gyroscope, said masses being disposed in paths traversed by said element when said gyroscope moves about its said axes to cause said masses to exert both frictional and acceleration torques on said gyroscope, and means carried by said gyroscope on the opposite side of its said axes from said element for equilibrating the torques exerted on said gyroscope by said masses when said gyroscope is in its normal position.

16. A gyro-vertical construction comprising a casing, means supporting said casing for oscillation about mutually perpendicular horizontal axes, a rotor journaled in said casing for spinning about an axis to which both of said axes of said casing are perpendicular, and erecting means comprising a pair of pendulous stators normally in stable equilibrium, each of said stators being freely mounted for oscillation under the influence of gravity about an axis normally coinciding with one of said axes of said casing and each of said stators extending under said casing in spaced relation thereto, and a rotor element cooperatively associated with said stators and comprising a normally vertical member revolubly mounted on said casing and extending downward therefrom into slots in both of said stators to make frictional engagement therewith when said member is displaced from the vertical, and means for rotating said member in a direction opposite to the direction of spin of said rotor.

17. A gyro-vertical construction comprising a casing, means supporting said casing for oscillation about mutually perpendicular horizontal axes, a gyro rotor journaled in said casing for spinning about an axis to which both of said axes of said casing are perpendicular, and erecting means comprising a pair of pendulous stators normally in stable equilibrium, each of said stators being freely mounted for oscillation under the influence of gravity about an axis normally coinciding with one of said axes of said casing and each of said stators extending under said casing in spaced relation thereto, and a rotor element cooperatively associated with said stators and comprising a normally vertical member revolubly mounted on said casing and extending downward therefrom into slots in both of said stators to engage at least one of said stators when said member is displaced from the vertical to exert acceleration torque on said gyroscope, means for rotating said member oppositely with respect to said rotor to exert frictional torque on said gyroscope upon engagement of either of said stators by said member, and means carried by said casing above its said axes for equilibrating said gravitational torque when said gyroscope is in its normal position.

18. In a gyro-vertical construction, a gyroscope, and erecting means therefor comprising a rotor element carried by said gyroscope, driving means therefor, and means associated therewith providing a stator element disposed in position to be engaged by said rotor element when said gyroscope becomes displaced from pre-selected position to develop friction therebetween and thereby generate an erecting torque acting on said gyroscope in a direction normal to the direction of its precedent displacement, said driving means comprising a rotatable driving element journaled adjacent said rotor element, rotating means therefor, and friction means carried by said rotor element and engaging said rotatable driving element with pre-determined pressure whereby the maximum magnitude of erecting torque exerted by said rotor element is pre-determined.

19. In a gyro-vertical, the combination of means providing a supporting frame, a gyroscope including a gyro rotor structure, means supporting said gyro rotor structure upon said frame for freedom of movement about mutually perpendicular axes, and erecting means operable when said gyroscope's spinning axis becomes displaced from predetermined attitude for applying torque to said gyro rotor structure in a direction at right angles to such displacement, said erecting means comprising torque-exerting means and gravity influenced pendulous means pivotally mounted on said frame for receiving the reaction to said torque and transmitting said reaction to said frame through the pivotal mounting of the torque-receiving means.

20. In a gyro-vertical, the combination of means providing a supporting frame, a gyroscope including a gyro rotor structure, means supporting said gyro rotor structure upon said frame for freedom of movement about mutually perpendicular axes, and erecting means operable when said gyroscope's spinning axis becomes displaced from predetermined attitude for applying torque to said gyro structure in a direction at right angles to such displacement, said erecting means comprising a rotor element carried by said gyro rotor structure, rotating means therefor, and a stator arranged in cooperative relationship to said rotor element to resist rotation thereof by applying a force eccentrically thereto, said stator comprising gravity influenced pendulous means pivotally mounted on said frame for transmitting the reaction of said torque to said frame through the pivotal mounting of said stator.

21. In a gyro-vertical, the combination of means providing a supporting frame, a gyroscope including a gyro structure, means supporting said gyro rotor structure upon said frame for freedom of movement about mutually perpendicular axes, and erecting means operable when said gyroscope's spinning axis becomes displaced from predetermined attitude for applying torque to said gyro rotor structure in a direction at right angles to such displacement, said erecting means comprising a rotor element carried by said gyro rotor structure, rotating means therefor, and a pair of stators disposed in cooperative relationship with said rotor element to resist rotation thereof by applying force thereto at a point out of axial alignment with said rotor element, each of said stators being pendulous and freely mounted independently of the other of said stators and for oscillation under the influence of gravity about an axis perpendicular to that of the other of said stators.

22. In a gyro-vertical, the combination of means providing a supporting frame, a gyroscope including a gyro rotor structure, means supporting said gyro rotor structure upon said frame for freedom of movement about mutually perpendicular axes, and erecting means operable when said gyroscope's spinning axis becomes displaced from predetermined attitude for applying torque to said gyro rotor structure in a direction at right angles to such displacement, said erecting means comprising a rotor element carried by said gyro rotor structure, rotating means therefor, and a pair of stators disposed in cooperative relationship with said rotor element to resist rotation thereof by applying force thereto at a point out of axial alignment with said rotor element, each of said stators being pendulous and freely mounted upon said frame independently of the other of said stators and for oscillation under the influence of gravity about an axis perpendicular to that of the other of said stators.

THOMAS O. SUMMERS, Jr.

REFERENCES CITED

The following references are of record in the file of this patent:

UNITED STATES PATENTS

| Number | Name | Date |
|---|---|---|
| 1,733,531 | Dugan | Oct. 29, 1929 |
| 2,188,606 | Koster | Jan. 30, 1940 |
| 2,229,645 | Esval et al. | Jan. 28, 1941 |
| 2,295,158 | Carter | Sept. 8, 1942 |
| 1,825,345 | Fieux | Sept. 29, 1931 |
| 2,103,287 | Howard | Dec. 28, 1937 |